United States Patent [19]

Giovanna

[11] Patent Number: 4,984,867
[45] Date of Patent: Jan. 15, 1991

[54] CONNECTOR FOR OPTICAL FIBER CONDUCTORS

[75] Inventor: Marco D. Giovanna, Paderno Ponchielli, Italy

[73] Assignee: Sirti S.p.A., Milan, Italy

[21] Appl. No.: 472,252

[22] Filed: Jan. 30, 1990

[30] Foreign Application Priority Data

Feb. 3, 1989 [IT] Italy .................. 19312 A/89

[51] Int. Cl.⁵ .......................... G02B 6/26; G02B 6/36
[52] U.S. Cl. ............................................... 350/96.21
[58] Field of Search ............... 350/96.10, 96.20, 96.21, 350/96.22

[56] References Cited

U.S. PATENT DOCUMENTS 4,747,656  5/1988  Miyahara et al. ............ 350/96.20
4,793,683  12/1988  Cannon, Jr. et al. ........... 350/96.21
4,895,425  1/1990  Iwano et al. .................. 350/96.20

Primary Examiner—Akm Ullah
Attorney, Agent, or Firm—Charles E. Brown; Charles A. Brown

[57] ABSTRACT

The connector (20) for optical fiber conductors is of the type used in order to connect two conductors (3) respectively leading to a fixed unit and to a mobile unit with each other. The connector (20) comprises a male element (21) and a female element (22) which unite with each other by a spring-like coupling along the axis of connection (15) of the connector. The female element (22) comprises a sleeve portion (25) and is free of performing translational movements on a perpendicular plane relatively to the axis of connection (15), but is not free to rotate around the axis.

5 Claims, 3 Drawing Sheets

CONNECTOR FOR OPTICAL FIBER CONDUCTORS

It is well known that when two optical fibre conductors have to be connected with each other, the ends of the two conductors have to come to perfectly mate with each other, therefore with a complete coincidence and mutual superimposition of the end sections.

Connectors of both of the flying type, and of the type to be used in order to connect a fixed unit with a movable unit are known. The fixed unit and the movable unit can be constituted, e.g., by two frames to which even a plurality of pairs of optical fiber conductors may arrive, which have to be connected.

An example of connectors known from the prior art is disclosed in Italian model of utility No. 208.212 to the same Applicant.

Such a type of connectors comprise an element substantially acting as a sleeve, suitable for simultaneously constraining in a mutually facing position two identical plugs, each of which contains the end of the relevant optical fiber conductor belonging to the pair of optical fiber conductors to be connected to each other.

The plugs, and therefore the end sections of the conductors are guided in order to get connected with each other along a common connection axis, thanks to a precision bush contained inside the sleeve element. The bush is provided with mutually opposite, mutually aligned, cone-frustum-shaped flarings, which are occupied by the cone-frustum-shaped ends of the plugs. The cone-frustum-shaped ends of the plugs come into contact with each other inside the interior of the sleeve, causing the end sections of the optical-fiber conductors to coincide with each other.

It is evident that the small tolerance of concentricity of the end section of each optical fiber conductor relatively to the cone-frustum-shaped ends of the relevant plug is of basic importance in order to achieve the perfect coincidence and mutual superimposition of the end sections of the two conductors to be connected with each other, and therefore the perfect functionality of the connection.

In order to achieve the perfect coincidence and mutual superimposition of the end sections of the conductor, the connectors, such as those disclosed in the hereinabove cited utility model No. 208.212 have been so modified as to define the radius along which there are the errors of concentricity of the end section of the conductor relatively to the cone-frustum-shaped end of the plug. When the angular position of the radius relatively to a reference radius, is defined, a key is associated with the plug, which key imposes the obliged angular position of the cone-frustum-shaped end of the same plug relatively to the sleeve, and therefore also relatively to the cone-frustum-shaped end of the other plug of the connector, as modified in the same way.

The high precision in the coincidence and mutual superimposition of the end sections of the two conductors to be connected with each other is reached thanks to the coincidence of the radii along which the errors of tolerance of concentricity are present, with the errors being therefore automatically compensated for at the time of closing of the connector.

The presence of the key also ensures that the high precision in the connection can be obviously obtained for any ranges of plugs coming from one or more plug batches, and for each operation of closing of the connector, and therefore of mutual connection of the conductors. At present, owing to their structure, the connectors for coupling a fixed unit with a movable unit (defined in shorter form in the following as "connectors for fixed units") are not capable of exploiting the compensation for the tolerances of concentricity. In fact, they comprise a female element and a male element. The female element comprises a flanged sleeve and a base for fastening the same element onto the purposely provided seat for it.

The sleeve is constrained to the base by means of a counter-flange which retaines the same flange, anyway leaving the flange—and consequently the same sleeve—free to rotate relatively to the connection axis, as well as to perform translational movements on a plane perpendicular to the axis.

Therefore, the cone-frustum-shaped plug engage the female element according to angular positions randomly variable at each connection operation, which randomly variabale positions, therefore, do not make it possible the compensation for the tolerances of concentricity of the end sections of the two conductors to be connected with each other to be carried out, contrarily to what the case is already now for the connectors of flying type.

On the other hand, one could not even think of rigidly locking the sleeve to the base, because the adoption of such a measure would not make it possible the joint(s) of two mutually opposite frames to be closed any longer in case a misalignment of the frames exists, or a misalignment exists between the male elements and the female elements of the connectors installed on the mutually opposite frames.

The purpose of the instant invention is of providing a connector for optical fiber conductors, which connector can be used on fixed units and is capable of making it possible the compensation for the tolerances of concentricity of the conductors relatively to the plugs which bear them to be carried out, and is simultaneously capable of being closed along the connection axis pre-established by the remaining male portion, which male portion is irremovably fastened onto the frame which supports it.

In that way, it becomes it possible one or more pair(s) of optical fiber conductors which respectively arrive to a fixed frame and to a movable frame to be connected, with the automatic alignment being obtained of one of the two portions of the connectors along the connection axis pre-established by the other, irremovable portion and the automatic compensation for the errors of tolerance of concentricity of the connector and/or connectors installed on the frames to be simultaneously obtained as well.

Such a purpose is achieved by a connector for optical fiber conductors comprising a female element and a male element of the type associatable to a fixed unit and to a movable unit sliding under coupling conditions towards the fixed unit in order to connect the end sections of at least one pair of optical fiber conductors leading to the fixed unit and to the movable unit with each other, with the connector of such a type comprising a first plug and a second plug identical to each one, with each one of the plugs housing the end section of an optical fiber conductor of the pair of optical fiber conductors to be connected to each other, a male element and a female element respectively housing, according to a precise and predetermined angular position, the first plug and the second plug positioned in mutually opposite positions and orientated according to a common axis with the consequent perfect coincidence and mutual superimposition of the end sections of the two optical-fiber conductors of the pair of optical-fiber conductors when the male element is housed inside the female element according to the common axis with the common axis being the axis of connection of the connector, with the female element comprising a base and a sleeve, characterized in that the sleeve is free of getting positioned relatively to the base by only performing translational movements on a plane perpendicular to the axis of connection of the connector, with the rotation of the sleeve around said connection axis of the connector or around axes parallel to it, being prevented.

While the fixed unit is being connected with the movable unit, the movable unit houses the male element with the first plug angularly orientated according to a pre-established position, the fixed unit houses the female element with the second plug also angularly orientated in a pre-established way as a function of the angular position taken by the first plug, and in such a way as to obtain in the whole unit the coincidence of the radii along which the errors of concentricity of the conductors relatively to the relevant plug are present, so as to compensate for the errors. The sleeve of the female element is free of moving on a plane perpendicular to the connection axis (without anyway rotating around itself), it making it hence possible the male element to get engaged with the female element also is case the male element is not approached to the female element by being moved along a common axis, but without altering the angular correspondence of the plugs.

The invention is illustrated now for merely exemplifying, non-limitative, purposes, in the figures of the hereto attached drawing tables, in which.

Figure 1:
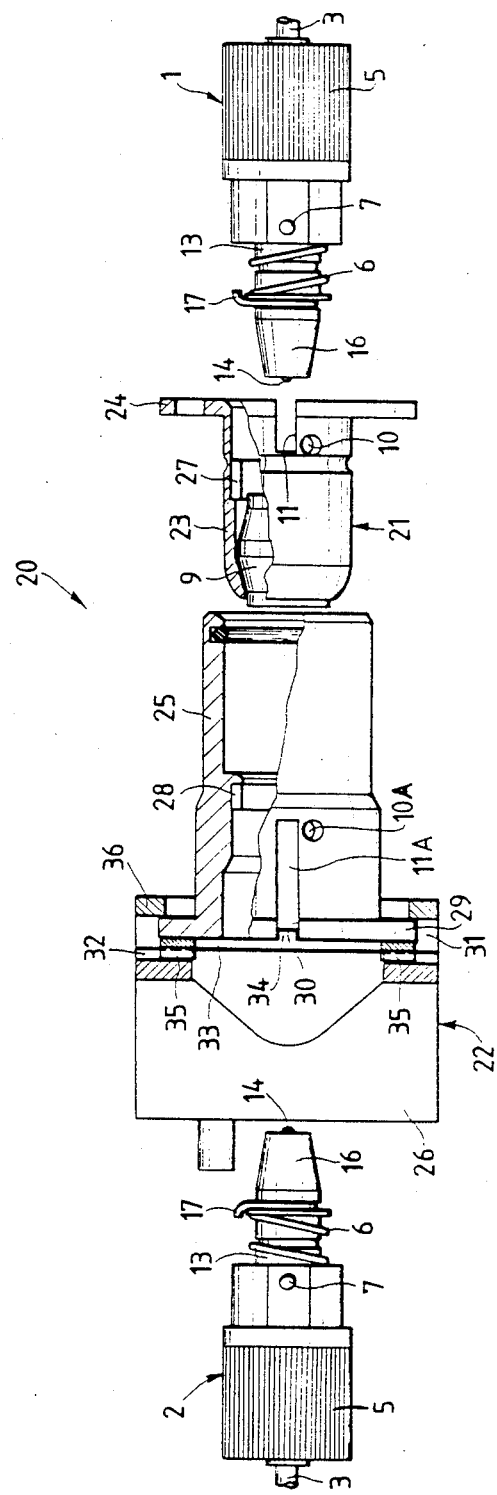
FIG. 1 shows an exploded, partially sectional, view of a connector for optical fiber conductors according to the present invention.
Figure 2:
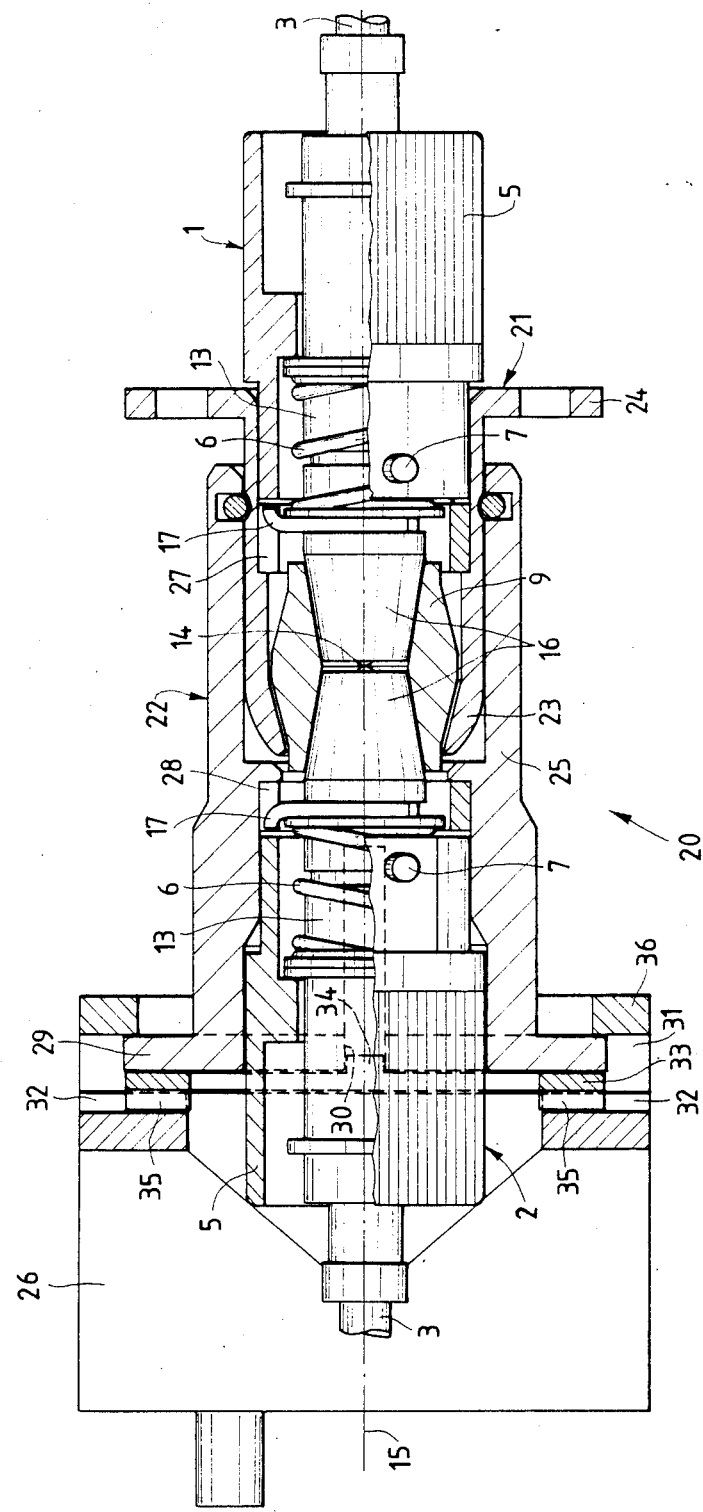
FIG. 2 shows a partially sectional view of the connector in its closed positions, hence in its position of connection of the conductors leading to it.

Referring to the above cited figures, the connector according to the present invention, generally indicated by the reference numeral 20, comprises a male element 21 and a female element 22.

The male element 21 and the female element 22 respectively house a first plug 1 and a second plug 2, identical to each other, and briefly disclosed in the following.

The plug 1, 2 comprises a core element 13, a knurled ring nut 5 and a spring 6 which keeps the core element 13 elastically retained inside the seat purposely provided for it. The core element 13 is provided with a cone-frustum-shaped end 16 with which a key 17 is integral.

The optical fiber conductor 3 ends inside the core element 13, and the optical fiber conductor protrudes, by means of its own end section 14, outside the same cone-frustum-shaped end 16.

The knurled ring nut 5 bears a pair of pins 7 in order to engage, by means of a bayonet coupling, the male element 21 or the female element 22.

The male element 21 comprises a tubular body 23 provided with a flange 24 and housing, inside its interior, a precision bush 9. The flange 24 allows the male element 21 to be fastened to a frame, e.g., to a frame of sliding type.

The precision bush 9 is given the shape of two mutually aligned, mutually opposite, conical flarings, suitable for housing the cone-frustum-shaped ends 16 of the plugs 1 and 2.

Inside the interior of the tubular body 23 a first keyhole 27 is provided, which is suitable for housing the key 17 of the first plug 1, and on the wall thereof a pair of symmetrical bores 10 are provided, with each of the bores being associated with a rectilinear slot 11 provided in positions corresponding to the positions of the pair of pins 7 provided on the knurled ring nut 5.

The female element 22 comprises, on the contrary, a sleeve 25 and a base 26 which makes it possible it to be fastened to a panel board, such as, e.g., a panel board of fixed type. The sleeve is capable of housing inside its interior the male element 21, and the second plug 2, with an engagement of spring-like type; with the second plug 2 being orientated in a pre-established angular position thanks to the presence of a second keyhole 28 suitable for engaging the key 17.

Also on the wall of the sleeve 25, a pair of symmetrical bores 10A are present; with each one of the symmetrical bores being associated with a rectilinear slot 11A.

The cone-frustum-shaped ends 16 of the first plug 1 and of the second plug 2 come into contact with each other inside the interior of the precision bush 9 according to a common axis, i.e., the axis of connection 15 of the connector.

Figure 3:
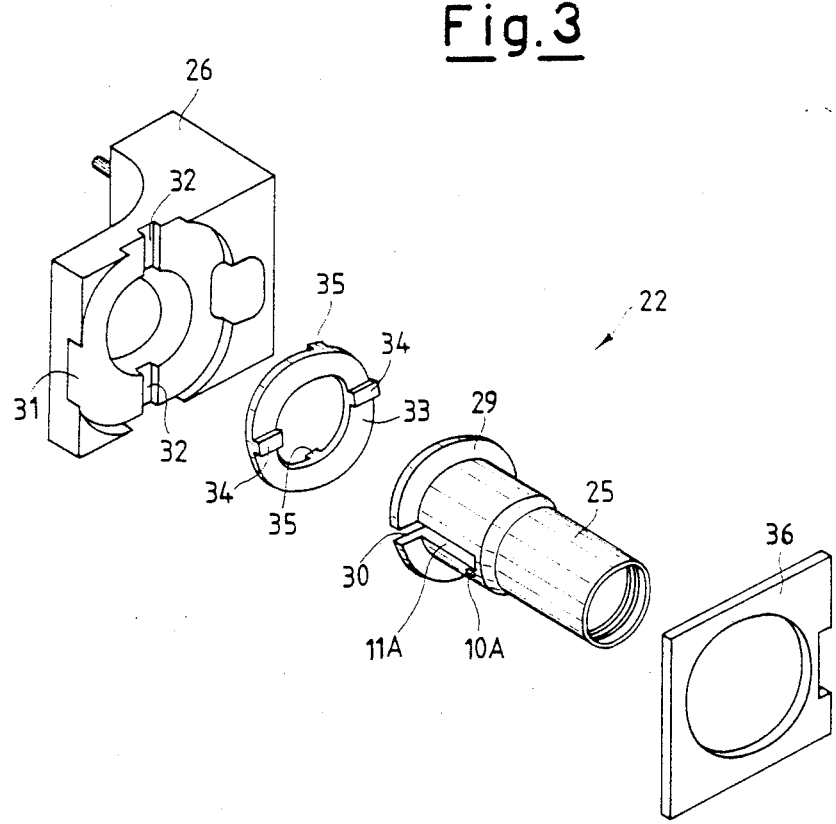
FIG. 3 shows a perspective, exploded view of some components of the female element of the connector.

The sleeve 25 (reference is made in particular to FIG. 3) comprises a flange 29 provided with a first groove 30 perpendicular to the axis 15.

The base 26 comprises a flat housing 31 facing the flange, and provided with a second groove 32 perpendicular to the axis 15 and to the first groove 30.

Between the flange 29 and the flat housing 31 an annular element 33 is interposed, which comprises a first face and a second face respectively supporting a first pair of keys 34 and a second pair of keys 35 positioned at the ends of two diameters perpendicular to each other.

The first pair of keys 34 engages the first groove 30 and the second pair of keys 35 engages the second groove when the flange 29 is retained inside the flat housing 31 by a counter-flange 36 screwed down onto the base 26.

While the two parts of the connector 20 are being connected with each other, the sleeve 25 can slide inside the flat housing 31 both along the first diameter and along the second diameter, or along a direction given by the combination of said two sliding movements, but with no possibility of revolving around itself around the axis of connection 15 of the same connector.

In such a way, the connector makes it possible the female element 22 to be correctly aligned relatively to the male element, but without the first plug 1 and the second plug 2 undergoing an alteration in their angular position relatively to the axis 15, as pre-established by the engagement of the keys 17 with the first keyhole 27 and the second keyhole 28.

In such a way, also for connectors of the type useable for fixed units, the perfect coincidence and mutual superimposition of the end sections 14 of the conductors 3 to be connected with each other, can be obtained.

I claim:

1. A connector (20) for a optical fiber conductors each having an end section, said connector comprising a female element (22) housed within a fixed unit and a male element housed within a moveable unit, said moveable unit being moveable towards said fixed unit whereby said female and male elements are coupled together connecting the end sections of at least one pair of optical fiber conductors (3) with each other, said connector (20) further comprising a first plug (1) and a second plug (2), said first and second plugs being identical to each other, each of said plugs housing the end section of one of said optical fiber conductors, said first plug being housed at a precise and predetermined angular position within said male element, said second plug being housed at a precise and predetermined position within said female element, said first and second plugs being positioned in mutually opposite positions and oriented along a common axis (15) of said connector whereby the consequent perfect coincidence and mutual superimposition of the end sections of said at least pair of optical fiber conductors results when said male element is coupled with said female element along said common axis, said female element (22) comprising a base (26) and a sleeve (25), said sleeve having means for positioning said sleeve with said base by a translational rotation of said sleeve on a plane perpendicular to said common axis of said connector, said sleeve positioning means preventing further rotation about said common axis of said connector, said sleeve further comprising a flange (29) provided with a first groove (30), said first groove being perpendicular to the common axis of said connector, and said base (26) comprising a flat housing (31) opposite to said flange, said flat housing having a second groove (32) being perpendicular to said first groove, an annular element (33) being interposed between said flange and said flat housing, said annular element comprising a first face and a second face, said first face supporting a first pair of keys (34) positioned at the end of a first diameter and engaging said first groove, said second face supporting a second pair of keys (35) positioned at the ends of a second diameter perpendicular to the first diameter and engaging said second groove, said flange being kept retained inside an interior of said flat housing by a counter-flange (36) fastened to said base.

2. Connector according to claim 1, wherein the predetermined and precise angular position of said first plug (1) and of said second plug (2) inside the male element (21) and of the female element (22) is obtained by means of keying means comprising a key (17) engaged inside the relevant keyhole (27, 28).

3. Connector according to claim 2, wherein the key (17) is housed on the first plug (1) and on the second plug (2), and the keyhole (27, 28) is respectively provided inside the male element (21) and the female element (20).

4. Connector according to claim 3, wherein the key (17) is housed on the plug (1, 2) as a function of the position of the errors of tolerance of concentricity of the end section (14) of the optical fiber conductor relatively to the same plug (1, 2).

5. Connector according to claim 1, wherein the plugs (1, 2) are constrained to the male element (21) and to the female element (22) by means of bayonet coupling means.

* * * * *